United States Patent
Gilligan et al.

[15] 3,699,168
[45] Oct. 17, 1972

[54] PREPARATION OF CERTAIN DIFLUOROAMINO COMPOUNDS

[72] Inventors: William H. Gilligan; William E. McQuistion, both of Washington, D.C.

[73] Assignee: The United States of America as represented by the Secretary of the Navy

[22] Filed: Oct. 26, 1967

[21] Appl. No.: 679,289

[52] U.S. Cl. .........260/583 NH, 149/109, 260/584 R
[51] Int. Cl. .........................C07c 87/22, C07c 83/00
[58] Field of Search ....260/583, 584, 583 NH, 584 R

[56] References Cited

UNITED STATES PATENTS

| | | |
|---|---|---|
| 3,347,922 | 10/1967 | Rhodes et al..............260/583 |
| 3,349,129 | 10/1967 | Stogryn et al..............260/584 |
| 3,358,013 | 12/1967 | Freeman et al............260/482 |

*Primary Examiner*—Leland A. Sebastian
*Attorney*—R. S. Sciascia and J. A. Cooke

[57] ABSTRACT

A method for providing tris(difluoroamino)alkanes which comprises reacting difluoroamine with an unsaturated carbonyl containing compound in the presence of a catalytic amount of toluene sulfonic acid and reacting the product so formed with additional amounts of difluoroamine in the presence of a catalytic amount of concentrated sulfuric acid.

9 Claims, No Drawings

PREPARATION OF CERTAIN DIFLUOROAMINO COMPOUNDS

BACKGROUND OF THE INVENTION

This invention relates to a method for providing high energy difluoroamino compounds and more particularly to a method for preparing tris(difluoroamino)alkanes.

It is well established that organic compounds containing one or more $-NF_2$ groupings are especially useful for their capability of releasing upon decomposition, large quantities of high energy, thereby rendering this class of materials particularly desirable as additives for high energy propellants and explosives. In particular, difluoroamino compounds decompose to produce gaseous hydrogen fluoride releasing to the surroundings the high heat of formation of this byproduct, notably 104 kilocalories per mole. One particularly good application for such high energy compounds is in the field of monopropellants where high impetus capabilities are required, such as in torpedo applications.

Prior to this invention, the usual method for preparing difluoroamino compounds was to add a carbonyl compound to a refluxing solution of difluoroamine while in contact with concentrated sulfuric acid. Many carbonyl compounds, however, such as methyl vinyl ketone and the like, tended to react strongly with such acids producing a tarry residue which substantially reduced the ultimate yield.

One method for improving yield, as taught by the prior art, comprises reacting a carbonyl compound with difluoroamine while in the presence of a strong cation exchange resin catalyst. While this technique has some inherent advantages, it results in the formation of an hydroxy containing difluoroamino compound which is not generally useable for high energy compositions. While it is generally known that such hydroxy compounds can be further reacted to provide a useable tris(difluoroamino)alkane, such further reaction with a hydroxy compound of the type formed by the cation exchange resin technique is difficult since the resin catalyst must first be separated, thereby introducing additional steps and increasing handling problems.

SUMMARY OF THE INVENTION

Accordingly, it is an object of this invention to provide a novel method for preparing tris(difluoroamino)alkanes in good yield.

It is further an object of this invention to provide a method for preparing difluoroamino compounds which can be used in rocket propellants and explosives.

It is also an object to provide a method for preparing difluoroamino compounds which may be used as high impetus monopropellants for torpedo applications.

Finally, it is another object of this invention to provide a method for preparing hydroxy containing difluoroamino compounds which can be readily reacted to form a tris-(difluoroamino)alkane.

The novel method of this invention comprises reacting a carbonyl compound with difluoroamine in the presence of a toluene sulfonic acid catalyst. The reaction product is thereafter treated with additional amounts of difluoroamine and reacted in the presence of concentrated sulfuric acid to form the desired tris(difluoroamino)alkane.

DETAILED DESCRIPTION OF PREFERRED EMBODIMENTS

According to this invention, a carbonyl compound is dissolved in a suitable solvent and reacted with difluoroamine in the presence of p-toluene sulfonic acid. For this purpose, a wide variety of non-aromatic halogen containing or hydrocarbon solvents may be used. For example, there may be mentioned alkanes, such as pentane, hexane, heptane, octane and the like; cycloalkanes, such as cyclohexane, cycloheptane and the like; and chloroalkanes, such as methylene chloride, chloroform, carbon tetrachloride, 1,2-dichloroethane, 1,1,1-trichloroethane, 1,2,3-trichloropropane and the like.

The carbonyl containing compound may be either an unsaturated aldehyde or an unsaturated ketone. For example, such carbonyl containing compounds operable within the scope of this invention include the ketones, such as methyl vinyl ketone, ethyl vinyl ketone, 3-penten-2-one, and the like; also aldehydes, such as acrolein, crotonaldehyde and the like.

It is to be understood however that the invention is not limited to the above compounds since they are merely representative of the wide variety of aldehydes, ketones and solvents which are operable herein.

After the difluoroamine is condensed and dissolved in a suitable solvent, the p-toluene sulfonic acid catalyst is added in a catalytic amount and the solution is refluxed at about 12° to 25° C. The desired carbonyl compound is then slowly added to the refluxing solution and the reaction is continued for about 1 to 26 hours to form the respective hydroxy containing difluoroamino compound which can alternatively be separated from the reaction solution at this point or can be further reacted with additional amounts of difluoroamine. If the latter is desired, the solution is again brought to a refluxing condition and catalytic amounts of sulfuric acid are slowly added. The desired tris(difluoroamino)alkane is formed within 10 to 26 hours, but detectable quantities of the product can be obtained after periods as short as 10 to 15 minutes.

For this purpose, difluoroamine should be reacted with the carbonyl compound in a molar ratio of between 1/1 to 1/0.1 and preferably in the molar ratio of 1/0.4 in order to provide sufficient difluoroamine to assure complete reaction.

After the formation of the hydroxy substituted difluoroamino compound, the desired tris(difluoroamino)alkane can be formed by reaction with additional amounts of difluoroamine while in contact with the concentrated sulfuric acid. The additional quantities of difluoroamine should be about the same as the amount of difluoroamine originally used in the first reaction.

The sulfuric acid of the second reaction should have a concentration of at least 96 percent or more. Generally, the concentration used may be between 96 percent to 130 percent with 100 percent being preferred. It is to be understood however that whenever a concentration of greater than 100 percent is specified, the difference between the 100 percent and the figure given represents sulfur trioxide. The upper limit of sulfuric acid is not critical since it does not interfere with the reaction. Generally, at least one mole of sulfuric acid per mole of difluoroamine should be present and preferably at least three moles per mole of difluoroamine is desirable.

Having generally described the invention, further understanding can be obtained by reference to the following specific examples which are presented for purposes of illustration only and are not meant to be limiting in any manner.

EXAMPLE

Difluoroamine (5.0 g) was generated in a nitrogen atmosphere by hydrolysis of a difluorourea solution and collected in a cold trap at −80°. The difluoroamine was distilled from the trap into a mixture of 30 ml of methylene chloride and 0.05 g of p-toluene sulfonic acid monohydrate contained in a flask fitted with a magnetic stirrer, thermometer, addition funnel, and a reflux condenser containing a dry ice-acetone slush. When difluoroamine began to reflux from cold condenser, indicating saturation of the methylene chloride, 2.80 g (0.04 mole) of methyl vinyl ketone was added from the dropping funnel over a period of 20 minutes. Refluxing was continued at 12°–25° C. until the unreacted difluoroamine evaporated as the condenser slowly warmed to room temperature overnight. Total reflux time was approximately 13 hours. An additional 5.0 g of difluoroamine was then generated and distilled into the reaction mixture. When refluxing began, 20 ml of 100 percent sulfuric acid was added to the reaction flask over a period of 1 hour. After a reflux time of about 16 hours, the methylene chloride solution was separated, treated with anhydrous magnesium sulfate and most of the methylene chloride removed under reduced pressure. The residue was distilled from trap to trap on a vacuum line. The product, which was retained in a −36° C. trap, weighed 6.13 g (73 percent). Analysis of the product by vapor-phase chromatography, using a two-meter column of diisodecyl phthalate on Chromosorb at 125°, indicated a purity of 97 percent (percent relative area). The retention time and the infrared spectrum of the product coincided exactly with an authentic sample of 1,3,3-tris-(difluoroamino)butane. The infrared spectrum showed absorption bands at 6.8, 7.2, 10.0, 10.2, 10.5, 11.0, 11.3 and 11.6 microns.

Although the carbonyl compound of the foregoing example was methyl vinyl ketone, it should be understood that any of the above described carbonyl compounds can be reacted in essentially the same manner to provide essentially the same results.

It is apparent that many widely different embodiments of the foregoing invention may be practiced without departing from the spirit and scope thereof and therefore the invention is not intended to be limited except as in the following claims.

What is claimed as new and desired to be secured by Letters Patent of the United States is:

1. A method for preparing an hydroxy containing difluoroamino compound of the formula:

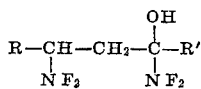

wherein each R and R' may be the same or different and wherein each R and R' is selected from the group consisting of hydrogen and alkyl, which method comprises, reacting difluoroamine, while in contact with a catalytic amount of p-toluene sulfonic acid, with a carbonyl containing compound of the formula;

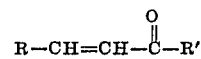

wherein R and R' is defined as above.

2. The method of claim 1 wherein said difluoroamine is reacted with said carbonyl containing compound in a molar ratio of from about 1/1 to about 1/0.1.

3. The method of claim 2 wherein said carbonyl containing compound is admixed with a refluxing solution of said difluoroamine and said p-toluene sulfonic acid.

4. The method of claim 3 wherein said solution of difluoroamine and p-toluene sulfonic acid is refluxed with a methylene chloride solvent.

5. A method for preparing a tris(difluoroamino)alkane having the formula:

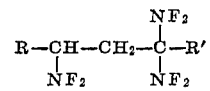

wherein each R and R' may be the same or different and wherein each R and R' is selected from the group consisting of hydrogen and alkyl, which method comprises;

reacting difluoroamine with an hydroxy containing difluoroamino compound of the formula;

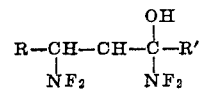

wherein each R and R' is defined as above, while in contact with a catalytic amount of concentrated sulfuric acid.

6. The method of claim 5 wherein said hydroxy containing difluoroamino compound is reacted with said difluoroamine in a molar ratio of 1/1 to about 1/0.1.

7. The method of claim 6 wherein said concentrated sulfuric acid is admixed with a refluxing solution comprising said hydroxy substituted difluoroamino compound and said difluoroamine.

8. A method of preparing a tris(difluroramino)alkane having the formula:

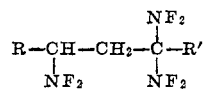

wherein each R and R' may be the same or different and wherein each R and R' is selected from the group consisting of hydrogen and alkyl, which method comprises;

a. reacting difluoroamine, while in contact with a catalytic amount of p-toluene sulfonic acid, with a carbonyl containing compound of the formula;

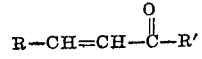

wherein R and R' is as defined above, and thereafter b. reacting the product formed in (a) with difluoroamine while in contact with a catalytic amount of concentrated sulfuric acid, and
c. recovering the corresponding tris(difluoroamino)-alkane.

9. The method of claim 8 wherein said difluoroamine is reacted with said carbonyl containing compound of step (a) in a molar ratio of from about 1/1 to about 1/0.1 and wherein said difluoroamine is reacted with said hydroxy substituted difluoroamino compound of step (b) in a molar ratio of from about 1/1 to about 1/0.1.

* * * * *